Jan. 21, 1958    R. C. SPENCER    2,820,502
AUTOMOBILE ANTISKID DEVICE
Filed April 10, 1956    2 Sheets-Sheet 1

Inventor:
Ralph Cushman Spencer
By Gary, Desmond & Parker
Attys.

Jan. 21, 1958  R. C. SPENCER  2,820,502
AUTOMOBILE ANTISKID DEVICE
Filed April 10, 1956  2 Sheets-Sheet 2

Inventor:
Ralph Cushman Spencer
By Gary, Desmond & Parker
Attys.

United States Patent Office 2,820,502
Patented Jan. 21, 1958

2,820,502
AUTOMOBILE ANTISKID DEVICE

Ralph Cushman Spencer, Lombard, Ill.

Application April 10, 1956, Serial No. 577,308

4 Claims. (Cl. 152—218)

This invention refers particularly to an antiskid device for removable attachment to the tire-carrying wheels of an automobile, and refers particularly to a device which requires no anchorage openings upon an automobile wheel yet may be mounted quickly, conveniently and securely upon a tire-carrying automobile wheel.

One of the important objects of the present invention resides in an antiskid device of the character described which may be mounted upon a tire-carrying automobile wheel with as great or even greater convenience and facility as a single conventional emergency chain, yet requires no anchorage openings in the wheel and with one application applies a plurality of antiskid chains in spaced relation upon the circumference of the tire.

Another important feature of the invention resides in an antiskid device comprising a plurality of circumferentially disposed chains which may be mounted upon a tire-carrying wheel without moving the automobile or rolling the wheel over the chains.

A further important aspect of the present invention resides in an antiskid device which comprises a basic structure for carrying chains which latter may be periodically removed or replaced.

An additional important aspect of the invention resides in a basic structure for carrying chains which is so hinged as to facilitate mounting of the device by "snaking" the device under the fender and over the top of the tire-carrying wheel.

Other objects and advantages of the invention will be apparent from the accompanying drawings and following detailed description.

Figure 2:
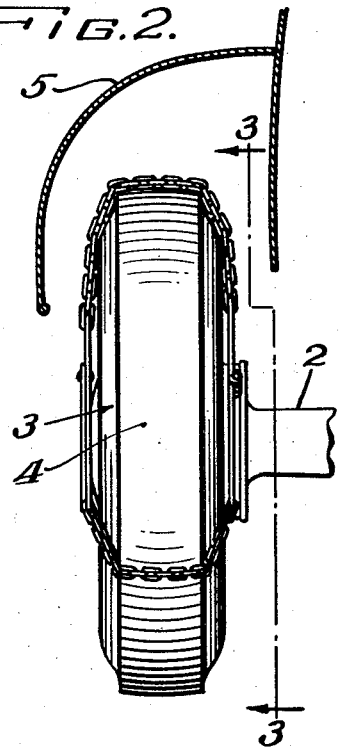
Fig. 2 is an end elevational view of the device, as shown in Fig. 1, showing the relationship of the fender to the wheel.
Figure 4:
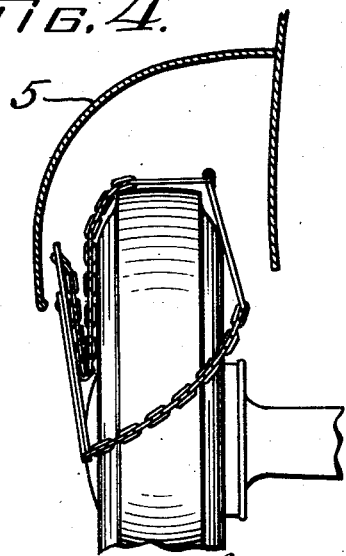
Fig. 4 is a fragmentary view similar to Fig. 2 showing the manner in which the device may be "snaked" under the fender and over the top of the wheel.

Referring in detail to the drawings, 1 indicates a conventional automobile wheel which may be carried by the automobile axle or axle housing 2. The wheel 1 carries a conventional inflated tire 3 having a tread portion 4. In Figs. 2 and 4, the spacial relationship of the automobile fender 5 is shown relative to the tire-carrying wheel 1.

The structure comprising the present invention includes a rear chain-carrying bar 6 which, when the device is mounted upon the tire-carrying wheel is disposed in substantially plane parallel relationship with the rear or inner face of the wheel 1. The bar 6 may be constructed of metal such as steel, aluminum or the like or may be constructed of a relatively tough plastic material and said bar is preferably arcuate in shape. An arm 7 is hingedly connected by means of hinge 8 to an end portion of the bar 6. The arm 7 is also preferably arcuate in shape conforming substantially with the radius of curvature of the bar 6. The hinge 8 is so disposed that the arm 7 may be swung at substantially right-angles to the plane of the bar 6, that is, at substantially right-angles to the plane of the wheel when the device is mounted thereon. The hinge 8 may permit the swinging of the arm 7 in both directions with respect to the bar 6 or said hinge may be swung inwardly with respect to said bar as shown best in Fig. 4. An arm 9 is similarly hingedly connected to the opposite end portion of the bar 6 by means of hinge 10 which may be of the same construction as the hinge 8.

The device also comprises a front chain-carrying bar 11 and pivotally connected to an intermediate portion of said bar is a front arm 12 which is swingable in substantially plane-parallel relationship to the front bar 11. The front bar 11 and front arm 12 may be constructed of a material similar to the material comprising rear bar 6 and the rear arms 7 and 9. The front chain-carrying bar 11 is preferably bent so that a portion 13 thereof will be positioned substantially radially when the device is mounted upon the wheel 1. The remaining portion 14 of the bar is so disposed as to carry a chain substantially radially upon the wheel, as will be hereinafter more fully described.

A chain 15 of the usual link type employed in an antiskid device may be secured at one end to an intermediate portion of the rear chain-carrying bar 6 and the opposite end of said chain may be secured to the end portion of the front chain-carrying bar 11, that is, the end portion of the member 13. Preferably, the ends of the chain 15 are such as to be removable with respect to the bars 6 and 11. A second chain 16 similar to chain 15 may be secured to the end portion 14 of the front chain-carrying bar 11 and the opposite end of said chain may be secured to an end portion of arm 9. A similar chain 17 may be secured at one end to the end of the front arm 12 and the opposite end of said chain may be secured to an end portion of the rear arm 7. The arrangement is such that when the device is mounted upon the tire-carrying wheel 1, the chains 15, 16 and 17 will be disposed at angles of 120° with respect to each other.

A tie member 18 is secured to an end portion of the front arm 12 and the opposite end of said tie member may be secured to an end portion of the front tire-carrying bar 11. In the embodiment illustrated the tie member 18 comprises a strap of the usual woven canvas type, said strap carrying a conventional buckle 19. When the device is mounted upon the wheel 1, the strap 18 may be tensioned in order to cause the chains 16 and 17 to embrace the tread portion 4 of the tire 3 and hold the chains 15, 16 and 17 in the desired angularly spaced relationship to each other.

In mounting the device comprising the present invention upon the tire 3 it is not necessary to jack up the wheel 1 nor is it necessary to roll the wheel over the chains comprising the device. By virtue of the hinged arms 7 and 9, the rear assembly comprising the rear chain-carrying bar 6 and the rear arms 7 and 9 may be moved upwardly under the fender 5 and by virtue of the hinged connections between the arms 7 and 9 and the bar 6 said arms may be caused to follow approximately the transverse contour of the tire. In this fashion the rear assembly may be moved through the space between the tire and the fender 5 and may be brought to the position shown in Fig. 4. Thereafter, the entire device may be positioned upon the wheel as shown best in Fig. 2.

Figure 1:
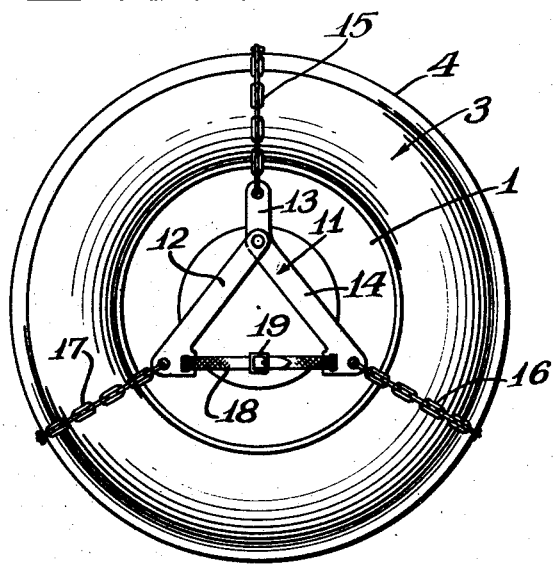
Fig. 1 is a front view of the device mounted upon a tire-carrying wheel.
Figure 3:
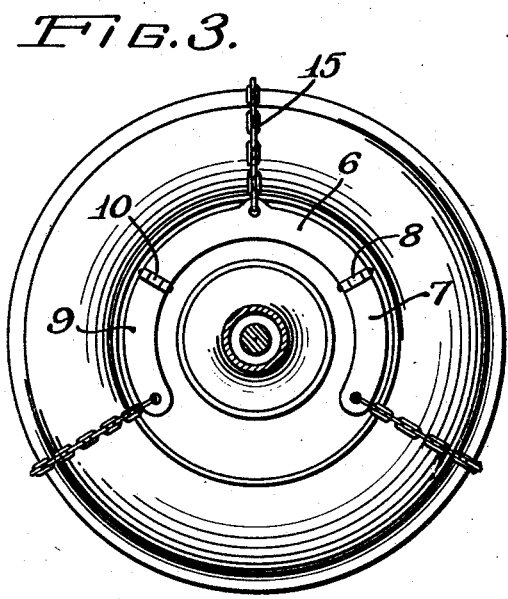
Fig. 3 is a rear view of the device mounted upon the tire-carrying wheel, looking in the direction of the arrows 3—3 in Fig. 2.

This aspect of the device is of decided advantage. It is not necessary to employ the anchorage openings which are provided in many automobile wheels. It is not necessary to roll the wheel over the chains of the device and of great importance, the device may be mounted upon the wheel when the lower portion of the wheel may be partially embedded in mud, sand or snow. In other words, it will be noted by the position of the chains 16 and 17 in Figs. 1, 2 and 3 that the chains may be fastened in the desired 120° relationship with respect to each other without moving any of the chains to a lower position than is shown in said figures. Hence, conceivably, the tire 3 may be embedded in mud, sand or snow up to the outer end portions of the looped chains 16 and 17.

Figure 5:
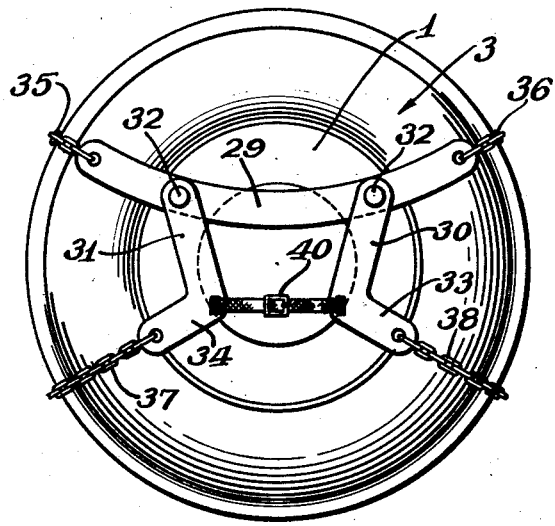
Fig. 5 is a front elevational view of a modification of an embodiment of the invention mounted upon a tire-carrying wheel.
Figure 6:
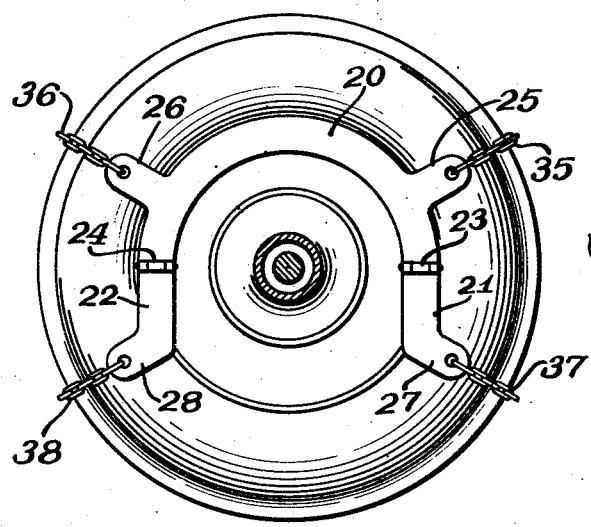
Fig. 6 is a rear view of the device shown in Fig. 5.
Figure 7:
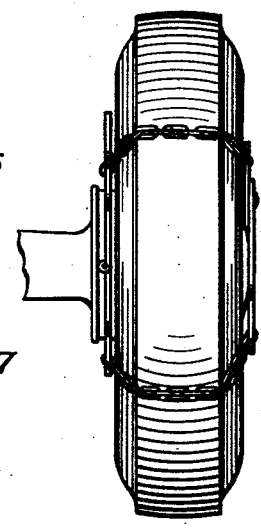
Fig. 7 is an end view of the modified device mounted upon a tire-carrying wheel.

Referring particularly to Figs. 5, 6 and 7, a modification of the present invention is illustrated. In this form of the invention a rear chain-carrying bar 20 is contemplated, the bar 20 being constructed of the same material as suggested with respect to the bars 6 and 11 and the arms 7, 9 and 12. To the opposite end portions of the rear bar 20 rear arms 21 and 22 may be hingedly connected, by means of hinges 23 and 24, respectively. The bar 20 is preferably arcuate in shape and may carry spaced chain-carrying lugs 25 and 26 which are radially disposed with respect to the arcuate bar 20. The arms 21 and 22 may also terminate in lugs 27 and 28, respectively, which are also adapted to carry chains.

The modified device also comprises a front chain-carrying bar 29 to which is secured spaced arms 30 and 31, said arms being pivotally secured to bar 29 by means of pivots 32. The end portions of the arms 30 and 31 may be bent or formed angularly with respect to the arms proper as indicated best at 33 and 34 in Fig. 5.

A chain 35 is secured to an end portion of the front chain-carrying bar 29 and also to lug 25. A similar chain 36 may be secured to the opposite end of the bar 29 and at its opposite end may be secured to lug 26. A chain 37 may be secured at one end to arm 31 and may, at its opposite end, be secured to the rear arm 21. A similar chain 38 may be secured at one end to the front arm 30 and at its opposite end may be secured to the rear arm 22. The manner of securement of the chains to the various bars and arms is the same as has been hereinbefore described with respect to chains 15, 16 and 17, that is, the chains may be removably secured whereby they may be removed or replaced as occasion demands.

A tie member 39 is secured to the front arm 30 and is also secured to the front arm 31. The tie member 39 is illustrated as being a conventional woven strap and carries the usual buckle 40. The tie member 39 functions to draw arms 30 and 31 toward each other whereby the chains 35, 36, 37 and 38 may be held in desired spaced, contacting relationship to the tread portion of the tire.

As will be noted in Figs. 5, 6 and 7 the chains 35 to 38 inclusive are circumferentially spaced upon the tire 3 in such manner that the chains 35 and 37 are spaced a distance equal to the spacing of the chains 36 and 38 and that the chains 35 and 36 are spaced equally to the spacing of the chains 37 and 38, but that the spacing of chains 35 and 36 and chains 37 and 38 is unequal to the spacing of the chains 35 and 37 and the chains 36 and 38. In this manner of mounting, the chains 37 and 38 will be a greater distance from the lower point of the tire, that is, the point where the tire rests upon the ground, than if the chains were all equally spaced from each other. This expedient permits the mounting of the device upon a wheel which may be embedded in mud, sand or snow a greater depth than would be the case if the chains were equally spaced from each other. To space the chains at different angles from each other it is merely necessary to change the radius of curvature of the bar 39 and dispose the lugs 25 and 26 closer together, and also change the angular relationship of the portions 33 and 34 with respect to the arms 30 and 31 respectively and change the angular relationship of the lugs 27 and 28 with respect to the arms 21 and 22, respectively.

In the form of the invention illustrated in Figs. 5, 6 and 7, the arms 21 and 22 hinge with respect to the bar 20 in such a manner as to permit the "snaking" of the rear arms 21 and 22 and rear bar 20 between the fender and the upper portion of the tire, as has been hereinbefore described in conjunction with the device shown in Figs. 1, 2, 3 and 4.

Other modifications of the invention which do not depart from the spirit of the invention will suggest themselves to anyone skilled in the art and hence it is not intended that the invention be limited to the precise details shown except as necessitated by the appended claims.

I claim as my invention:

1. An antiskid device for an automobile wheel having a tire which comprises, a rear chain-supporting bar, a plurality of arms permanently hinged to said bar and swingable at substantially right-angles to the plane of said bar, a front chain-supporting bar, a front arm pivotally secured to said front bar and swingable in substantially plane-parallel relationship to said front bar, and flexible chains connecting the front bar and front arm to the rear bar and rear arms.

2. An antiskid device for an automobile wheel having a tire which comprises, a rear chain-supporting bar for disposition in substantially plane-parallel relationship to the rear face of an automobile tire, a plurality of rear arms inseparably hinged to said bar in end-to-end relationship and swingable at substantially right-angles to the plane of said bar, the free ends of at least two rear arms being unconnected, a front chain-supporting bar for disposition in substantially plane-parallel relationship to the front face of an automobile tire, at least one front arm pivotally connected to said front bar and swingable in substantially plane-parallel relationship to said front bar, flexible chains connecting the rear bar and the front bar and the rear and front arms for embracing disposition with the tread of the tire, and means separably connecting a front arm and the front bar together to hold the chains in embracing relationship to said tire treads.

3. An antiskid device for an automobile wheel having a tire which comprises, a rear chain-supporting bar for disposition in substantially plane-parallel relationship to the rear face of an automobile tire, a pair of rear arms permanently hinged to opposite end portions of said bar and swingable at substantially right-angles to the plane of said bar, the free ends of said bars being unconnected with respect to each other, a front chain-supporting bar for disposition in substantially plane-parallel relationship to the front face of an automobile tire, a front arm pivotally connected to said front bar and swingable in substantially plane-parallel relationship to said front bar, a flexible chain connecting the front bar and rear bar for embracing relationship to the tread portion of the tire, a chain connecting said front arm to a rear arm for embracing relationship to the tread portion of said tire, and a chain connecting the front bar to a rear arm for embracing relationship to the tread portion of a tire.

4. An antiskid device for an automobile wheel having a tire which comprises, a rear arcuate chain-supporting bar for disposition in substantially plane-parallel relationship to the rear face of an automobile tire, a plurality of arcuate rear arms permanently hinged to said bar and swingable at substantially right-angles to the plane of said bar, the arc of said bar and arms being adapted to be concentric with the arc of the automobile tire and the arc formed by said arms being not greater than about 270°, a front chain-supporting bar for disposition in substantially plane-parallel relationship to the front face of an automobile tire, a front arm pivotally connected to said front bar and swingable in substantially plane-parallel relationship to said front bar, flexible chains connecting the front bar and arm to the rear bar and arms for embracing relationship to the tread portion of the tire, and tension means connecting the front arm and front bar together to hold the chains in embracing relationship with the tread portions of the tire.

References Cited in the file of this patent
UNITED STATES PATENTS

| | | |
|---|---|---|
| 2,328,808 | Holtz | Sept. 7, 1943 |
| 2,711,770 | Conoscente | June 28, 1955 |